(12) United States Patent
Yan

(10) Patent No.: US 7,981,990 B2
(45) Date of Patent: Jul. 19, 2011

(54) SYNTHESIS OF A LIQUID POLYMER AND A FUNCTIONALIZED POLYMER

(75) Inventor: Yuan-Yong Yan, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 238 days.

(21) Appl. No.: 12/199,919

(22) Filed: Aug. 28, 2008

(65) Prior Publication Data

US 2009/0062451 A1 Mar. 5, 2009

Related U.S. Application Data

(60) Provisional application No. 60/969,321, filed on Aug. 31, 2007.

(51) Int. Cl.
*C08F 36/04* (2006.01)
*C08F 4/48* (2006.01)
*C07C 2/02* (2006.01)
*C08F 8/42* (2006.01)

(52) U.S. Cl. ............. 526/335; 526/83; 526/84; 526/85; 526/179; 526/180; 585/12; 585/507

(58) Field of Classification Search .................... 585/12, 585/507; 526/82, 83, 84, 180, 179, 335; 525/236, 315
See application file for complete search history.

(56) References Cited

U.S. PATENT DOCUMENTS

| | | | |
|---|---|---|---|
| 3,352,934 A | * | 11/1967 | House et al. ................ 585/429 |
| 3,852,373 A | * | 12/1974 | Hesse et al. ................ 585/507 |
| 3,933,574 A | | 1/1976 | Zinoviev et al. |
| 5,216,181 A | * | 6/1993 | Hargis et al. ................ 549/513 |
| 6,437,205 B1 | | 8/2002 | Miller et al. |

FOREIGN PATENT DOCUMENTS

| JP | 08-073515 | 3/1996 |
|---|---|---|
| WO | 9305083 | 3/1993 |

OTHER PUBLICATIONS

Mar. 27, 2009 International Search Report from PCT Patent Application No. PCT/US2008/010189 (2 pp.).

* cited by examiner

*Primary Examiner* — Fred M Teskin
(74) *Attorney, Agent, or Firm* — Meredith E. Hooker; Nathan T. Lewis

(57) ABSTRACT

A method comprising: (a) forming a living liquid polymer, wherein said living liquid polymer is anionically initiated and comprises a cation; (b) adding a functional initiator precursor of the formula FI-H, wherein H is hydrogen and FI is a functional group, said H terminates said living liquid polymer resulting in said liquid polymer having a number average molecular weight of about 20,000 (g/mole) to about 100,000 (g/mole), and said FI and said cation form a functional initiator; (c) adding monomer, wherein said functional initiator initiates anionic polymerization of said monomer; and (d) terminating the polymerization reaction initiated in step (c). Steps (a) through (c) may be conducted in a single reactor, allowing a liquid polymer to be dispersed in a functionalized polymer in a single polymerization step. Thus, the liquid polymer does not have to be handled separately and processing efficiency is improved.

34 Claims, No Drawings

SYNTHESIS OF A LIQUID POLYMER AND A FUNCTIONALIZED POLYMER

This application claims the benefit of U.S. Provisional Application No. 60/969,321, filed Aug. 31, 2007, which is incorporated herein by reference.

FIELD OF THE DISCLOSURE

The disclosure relates to a polymer having at least one functional end group and a liquid polymer dispersed therein. The disclosure also relates to a method of making a polymer having at least one functional end group and a liquid polymer dispersed therein.

BACKGROUND OF DISCLOSURE

Liquid, or low molecular weight, polymers have been mixed with high molecular weight polymers in tire tread rubber compositions to impart good processability and offer a better balance of, for example, wet and snow properties. However, a significant drawback in using liquid polymers is processing and handling them in the manufacturing process. For example, liquid polymers may be made by polymerizing monomer units in a hydrocarbon solvent until a desired molecular weight is achieved. However, isolating the liquid polymer from the solvent by conventional methods such as coagulation is difficult due to the low molecular weight of the liquid polymer. To ease the ability of desolventizing the liquid polymer, the liquid polymer cement is often blended with a polymer cement of a higher molecular weight polymer, followed by desolventizing the blended cements. This, however, requires the liquid polymer and high molecular weight polymer to be polymerized separately and necessitates the additional step of blending. Thus, processing efficiencies are decreased.

It is also known to use polymers having functional end groups in rubber compositions suitable as, for example, tire treads. The functional group may be imparted on the polymer chain via the use of functional initiators and/or functional terminators. The type of functional group can be chosen based on the desired interaction with the end groups of other polymers and/or reinforcing fillers. These interactions typically reduce the hysteresis of the rubber composition giving rise to less heat build up and improved rolling resistance. However, many functional initiators have stability and solubility issues in hydrocarbon solvents.

There remains a need for a more efficient method of synthesizing a blend of a liquid polymer and a high molecular weight polymer. There also remains a need for a method of producing a high molecular weight polymer with functional end-groups via the use of functional initiators that provides for improved initiator stability and solubility.

SUMMARY OF DISCLOSURE

Provided is a method comprising: (a) forming a living liquid polymer, wherein said living liquid polymer is anionically initiated and comprises a cation; (b) adding a functional initiator precursor of the formula FI-H, wherein H is hydrogen and FI is a functional group, said H terminates said living liquid polymer resulting in said liquid polymer having a number average molecular weight of about 20,000 to about 100,000, and said FI and said cation form a functional initiator; (c) adding monomer, wherein said functional initiator initiates anionic polymerization of said monomer; and (d) terminating the polymerization reaction initiated in step (c). Advantageously, the method may be performed in a single reactor.

Also provided is a composition comprising a polymer which comprises (a) a FI functional group on at least one polymer chain end, and (b) a liquid polymer having a number average molecular weight of about 20,000 to about 100,000 dispersed in said polymer, wherein said polymer is prepared by (i) forming a living liquid polymer, wherein said living liquid polymer is anionically initiated and comprises a cation; (ii) adding a functional initiator precursor of the formula FI-H, wherein H is hydrogen and FI is a functional group, said H terminates said living liquid polymer resulting in said liquid polymer having a number average molecular weight of about 20,000 to about 100,000, and said FI and said cation form a functional initiator; (iii) adding monomer, wherein said functional initiator initiates anionic polymerization of said monomer; and (iv) terminating the polymerization reaction initiated in step (iii).

The composition comprising a polymer having at least one functional end group and a liquid polymer dispersed in said polymer may be useful in a tire component, such as a tread, subtread, or sidewall.

DETAILED DESCRIPTION

The liquid polymer may be produced by anionically polymerizing monomers capable of undergoing anionic polymerization upon reaction with an anionic initiator. Any monomer capable of anionic polymerization may be used. Exemplary monomers include, but are not limited to, diene monomers, vinyl-substituted aromatic monomers, and mixtures thereof. Suitable diene monomers include, but are not limited to, 1,3-butadiene, isoprene, 2-ethyl-1,3-butadiene, 2,3-dimethyl-1,3-butadiene, piperylene (1,3-pentadiene), 2-methyl-1,3-pentadiene, 3-methyl-1,3-pentadiene, 4-methyl-1,3-pentadiene, 2,4-dimethyl-1,3-pentadiene, 1,3-hexadiene and 1,2-diphenyl-4-methyl-1-hexene, and mixtures thereof. Suitable vinyl-substituted aromatic monomers include, but are not limited to, styrene, $\alpha$-methylstyrene, p-methylstyrene, vinyl toluene, vinyl anthracene, 2-vinylpyridene, 4-vinylpyridine, 1-vinylnaphthalene, 2-vinylnaphthalene, 1-$\alpha$-methylvinylnaphthalene, 2-$\alpha$-methylvinylnaphthalene, and mixtures thereof.

The anionic initiator used to produce the liquid polymer may be any anionic initiator known to those skilled in the art. Exemplary initiators include, but are not limited to, organo-lithium initiators. Preferred organo-lithium initiators have the formula $RLi_x$, wherein R represents a hydrocarbyl radical of about 1 to about 20, preferably about 2 to about 8 carbon atoms per R group, and x is an integer from 1 to about 4. Typical R groups include aliphatic and cycloaliphatic groups. Specific examples of R groups for substitution in the above formula include primary, secondary, and tertiary groups, such as n-propyl, isopropyl, n-butyl, isobutyl, t-butyl, and mixtures thereof.

Specific examples of suitable lithium initiators include n-butyl lithium, p-tolyllithium, 4-phenylbutyl lithium, 4-butylcyclohexyl lithium, lithium dialkyl amines, lithium dialkyl phosphines, lithiumalkyl aryl phosphine, lithium diaryl phosphines and mixtures thereof. Other suitable lithium initiators are those disclosed in U.S. Pat. No. 5,567,815, which is hereby incorporated by reference in its entirety.

The anionic initiator is employed in an amount designed to result in the desired molecular weight of the liquid polymer. The ratio of millimoles of the anionic initiator per hundred grams of the anionically polymerizable monomer ranges between 0.1 millimoles to 100 millimoles, or alternatively between 0.2 millimoles to 20 millimoles, or alternatively between 0.5 millimoles to 4 millimoles.

The anionic polymerization of the liquid polymer is conducted in a hydrocarbon solvent. Suitable hydrocarbon solvents include any suitable aliphatic hydrocarbons, alicyclic hydrocarbons, or mixture thereof, with a proviso that it exists in liquid state during the polymerization. Exemplary aliphatic hydrocarbons include, but are not limited to, pentane, isopentane, 2,2dimethyl-butane, hexane, heptane, octane, nonane, decane, and the like. Exemplary alicyclic hydrocarbons include, but are not limited to, cyclopentane, methyl cyclopentane, cyclohexane, methyl cyclohexane, cycloheptane, cyclooctane, cyclononane, cyclodecane, and the like.

If the liquid polymer is produced using a diene monomer, a vinyl modifier may be added to increase the 1,2-addition reaction of the diene. Such modifying agents are known in the art. These modifying agents may be employed in amounts generally ranging from about 1:100 to about 100:1 molar ratio of the modifier to anionic initiator. The 1,2-addition product can be increased from about the 5-15% range to as high as about 90% of the diene monomer units being incorporated into the liquid polymer.

Exemplary vinyl modifiers include one or more of hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, 2-2'-di(tetrahydrofuryl) propane, bis-oxalanyl propane, tri-n-propyl amine, trimethyl amine, triethyl amine, N,N-dimethyl aniline, N-ethylpiperidine, N-methyl-N-ethyl aniline, and N-methylmorpholine.

The polymerization temperature for producing the liquid polymer can vary over a broad range from about −50° C. to about 200° C., or alternatively from about −20° C. to about 140° C. The polymerization reaction is generally conducted for a time sufficient to obtain at least about 80%, or alternatively at least about 90%, or alternatively at least about 99% conversion of the charged monomer units.

The polymerization of the liquid polymer may be terminated after a number average molecular weight ($M_n$) of about 20,000 to about 100,000 is reached, or alternatively after a $M_n$ of about 40,000 to about 80,000 is reached, or alternatively after a $M_n$ of about 50,000 to about 60,000 is reached. The liquid polymer is terminated by adding a functional initiator precursor of the formula FI-H, wherein FI is a functional group and H is hydrogen. The H from the functional initiator precursor displaces the cation residing on the end of the living liquid polymer formed by the anionic initiator, thereby terminating the polymerization of the liquid polymer. The displaced cation then bonds with the FI functional group to form a functional initiator capable of initiating polymerization of additional monomers. The reaction mechanism of this process is believed to be as follows, showing 1,3-butadiene as the monomer for the liquid polymer and n-butyl lithium as the initiator for exemplary purposes only:

Mechanism I

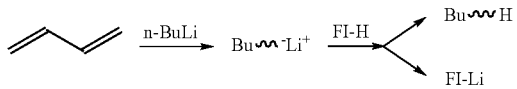

As may be appreciated by one skilled in the art, the amount of FI-H functional initiator precursor needed is dependent upon the desired molecular weight of the functional polymer and the desired amount of liquid polymer. Generally, the FI-H functional initiator precursor may be added in an amount ranging from a molar ratio of about 0.4 to 0.95 based on the total polymer mixture containing liquid and functional polymers, or alternatively from about 0.6 to about 0.8. The FI-H functional initiator may be added to the living liquid polymer cement, i.e. the liquid polymer in solvent, at a temperature range from about −50° C. to about 200° C., or alternatively from about −20° C. to about 140° C. Preferably, the temperature at which the FI-H functional initiator precursor is added is the temperature at which the liquid polymer was polymerized.

Suitable FI-H functional initiator precursors include, but are not limited to, secondary amines, functional dithianes, trialkyltin hydrides, and mixtures thereof. Exemplary secondary amines include, but are not limited to, pyrrolidine, piperidine, hexamethyleneimine, 4-(1-pyrrolidinyl)piperidine, 4-piperidinopiperidine, 4,4'-trimethylenedipiperidine, 1-isopropylpiperazine, 1-(3-methoxyphenyl)piperazine, 1-[2-(dimethylamino)ethyl]piperazine, 1-[3-(dimethylamino)propyl]piperazine, thiomorpholine, and mixtures thereof. Exemplary functional dithianes include, but are not limited to, 2-phenyl-1,3-dithiane, 2-[4-(dimethylamino)] phenyl-1,3-dithiane, 2-[4-(diethylamino)]phenyl-1,3-dithiane, 2-[4-(4-methylpiperazine)phenyl]-1,3-dithiane, and mixtures thereof Exemplary trialkyltin hydrides include, but are not limited to, tributyltin hydride, trioctyltin hydride, and mixtures thereof.

As mentioned above, the cation residing on the end of the living liquid polymer chain reacts with the FI functional group to form a functional initiator capable of initiating polymerization of additional monomers to form a functionalized polymer. In this process, the functional FI group is imparted on the beginning of the polymer chain to produce a functionalized polymer. To form a functionalized polymer using the functional initiator, the polymer cement containing the terminated liquid polymer and functional initiator may be charged to another reactor in combination with additional monomers and, optionally, additional hydrocarbon solvent. However, it is preferable to simply add the additional monomers, and optionally, additional solvent, directly to the same reactor containing the terminated liquid polymer and functional initiator. Conducting the polymerization of both the liquid polymer and the functionalized polymer in the same reactor allows for enhanced processing efficiency.

Any monomer capable of anionic polymerization may be polymerized using the functional initiator. Exemplary monomers include, but are not limited to, diene monomers, vinyl-substituted aromatic monomers, and mixtures thereof. Suitable diene monomers include, but are not limited to, 1,3-butadiene, isoprene, 2-ethyl-1,3-butadiene, 2,3-dimethyl-1,3-butadiene, piperylene (1,3-pentadiene), 2-methyl-1,3-pentadiene, 3-methyl-1,3-pentadiene, 4-methyl-1,3-pentadiene, 2,4-dimethyl-1,3-pentadiene, 1,3-hexadiene and 1,2-diphenyl-4-methyl-1-hexene, and mixtures thereof. Suitable vinyl-substituted aromatic monomers include, but are not limited to, styrene, α-methylstyrene, p-methylstyrene, vinyl toluene, vinyl anthracene, 2-vinylpyriene, 4-vinylpyridine, 1-vinylnaphthalene, 2-vinylnaphthalene, 1-α-methylvinylnaphthalene, 2-α-methylvinylnaphthalene, and mixtures thereof.

Suitable hydrocarbon solvents that may be added during the polymerization of the functionalized polymer include those mentioned above in regard to polymerization of the liquid polymer, including, but not limited to, pentane, hexane, heptane, octane, nonane, decane, cyclopentane, cyclohexane, cycloheptane, cyclooctane, and mixtures thereof.

If the functionalized polymer is produced using a diene monomer, a vinyl modifier may be added to increase the 1,2-addition reaction of the diene. Such modifying agents are known in the art. These modifying agents may be employed in amounts generally ranging from about 1:100 to about 100:1 molar ratio of the modifier to anionic initiator. The 1,2-addition product can be increased from about the 5-15% range to as high as about 90% of the diene monomer units being incorporated into the functionalized polymer.

Exemplary vinyl modifiers include one or more of hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, 2-2'-di(tetrahydrofuryl) propane, bis-oxalanyl propane, tri-n-propyl amine, trimethyl amine, triethyl amine, N,N-dimethyl aniline, N-ethylpiperidine, N-methyl-N-ethyl aniline, and N-methylmorpholine.

The polymerization of the functionalized polymer can vary over a broad range from about −50° C. to about 200° C., or alternatively from about −20° C. to about 140° C. The polymerization reaction is generally conducted for a time sufficient to obtain at least about 80%, or alternatively at least about 90%, or alternatively at least about 99% conversion of the charged monomer units.

The polymerization of the functionalized polymer may be terminated after a $M_n$ of about 100,000 to about 400,000 is reached, or alternatively after a $M_n$ of about 125,000 to about 300,000 is reached, or alternatively after a $M_n$ of about 150,000 to about 200,000 is reached.

To terminate the polymerization of the functionalized polymer, a terminating agent may be employed. Active hydrogen compounds such as water or alcohol can be used, or compounds providing terminal functionality may also be used. Examples of compounds that impart terminal functionality include, but are not limited to, $SnCl_4$, $R_3SnCl$, $R_2SnCl_2$, $RSnCl_3$, carbodiimides, N-methylpyrrolidine, cyclic amides, cyclic ureas, isocyanates, Schiff bases, 4,4'-bis(diethylamino) benzophenone, N,N'-dimethylethyleneurea and the like, where R is selected from the group consisting of alkyls having from about 1 to about 20 carbon atoms, cycloalkyls having from about 3 to about 20 carbon atoms, aryls having from about 6 to about 20 carbon atoms and aralkyls having from about 7 to about 20 carbon atoms. Typical alkyls include n-butyl, s-butyl, methyl, ethyl, isopropyl and the like. The cycloalkyls include cyclohexyl, menthyl and the like. The aryl and aralkyl groups include phenyl, benzyl, and the like. The terminating agent is added to the reaction vessel, and the vessel is agitated for about 1 to about 1000 minutes. It is to be appreciated that other terminating agents and/or procedures known to those skilled in the art may be followed.

The process for creating the functionalized polymer can be described by the following reaction mechanism, wherein T is a terminating agent as described above (1,3-butadiene is shown as the monomer for the functionalized polymer for exemplary purposes only):

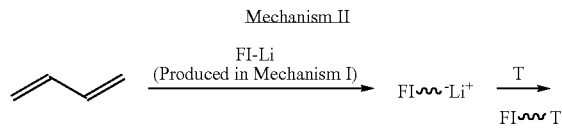

The process described above thus provides a functionalized polymer polymerized in the presence of a solution comprising a liquid polymer and hydrocarbon solvent. The resultant product is a functionalized polymer having a liquid polymer dispersed therein.

The weight ratio of liquid polymer to functionalized polymer may be from about 1:99 to 50:50, or alternatively from about 5:95 to 20:80. The ratio of liquid polymer to functionalized polymer is dependent upon many things, including the amount of monomers used to produce the liquid polymer versus the amount of monomers to produce the functionalized polymer, and the amount of initiator used to form the liquid polymer. Such adjustments are readily within the knowledge of one skilled in the art.

The functionalized polymer having a liquid polymer dispersed therein may be separated from the solvent by conventional techniques. These techniques include steam or alcohol coagulation, thermal desolventization, or any other suitable method. Additionally, solvent may be removed from the resulting polymer by drum drying, extruder drying, vacuum drying or the like. One advantage of the process in this disclosure is that the functionalized polymer may be polymerized in the presence of the liquid polymer. Therefore, the liquid polymer does not have to be desolventized in its isolated form, nor does it have to be blended with the functionalized polymer in a separate processing step.

If the functionalized polymer is polymerized in the presence of the liquid polymer according to the process in this disclosure, it is believed another advantage is that the microstructure of the liquid polymer and functionalized polymer will be more uniform. For exemplary purposes only, if the liquid polymer and functional polymer are both polybutadiene, it is believed that the 1,2vinyl, 1,4cis, and 1,4trans contents of the liquid polybutadiene will be more similar to that of the functional polybutadiene, as compared to a functional polybutadiene and a liquid polybutadiene that are simply blended together.

The functionalized polymer having a liquid polymer dispersed therein may be used in a vulcanizable rubber composition suitable as a tire component. Suitable tire components include, but are not limited to, tread, subtread, and sidewall. The functionalized polymer having a liquid polymer dispersed therein may be the sole polymeric ingredient in the rubber composition, or it may be used in combination with other elastomers. Thus, the polymers produced according to this disclosure may be used in an amount of 100 parts per hundred of elastomer (phr), or, if blended with other elastomers, may be used in an amount between 1 and 99 phr, or alternatively between 20 and 80 phr, or alternatively between 40 and 60 phr.

The other elastomers that may be blended with the polymers prepared according to this disclosure include, but are not limited to, natural rubber, synthetic polyisoprene rubber, styrene-butadiene copolymer rubber (SBR), polybutadiene, butyl rubber, poly(chloroprene), ethylene-propylene copolymer rubber, ethylene-diene terpolymer rubber (EPDM), acrylonitrile-butadiene copolymer rubber (NBR), silicone rubber, fluoroelastomers, ethylene-acrylic copolymer rubber, ethylene vinyl acetate copolymer (EVA), epichlorohydrin rubbers, chlorinated polyethylene rubbers, chlorosulfonated polyethylene rubbers, hydrogenated nitrile rubbers, tetrafluoroethylene-propylene copolymer rubber, and mixtures thereof.

Typically, these vulcanizable rubber compositions will include reinforcing fillers, such as carbon black and/or silica, and at least one vulcanizing agent. These compositions typically also include other compounding additives such as accelerators, oils, waxes, scorch inhibiting agents, and processing aids. These ingredients are known in the art, and may be added in appropriate amounts based on the desired physical and mechanical properties of the vulcanizable rubber composition.

The vulcanizable rubber composition may be compounded or blended by using mixing equipment and procedures conventionally employed in the art, such as mixing the ingredients in a Banbury mixer. Preferably, an initial masterbatch is prepared that includes the rubber component and the reinforcing fillers, as well as other optional additives such as processing oil and antioxidants. Once this initial masterbatch is prepared, the vulcanizing agents are blended into the composition. This vulcanizable composition of matter can then be processed according to ordinary manufacturing techniques.

The present invention will be described in more detail with reference to the following examples. The following examples are presented for purposes of illustration only and are not to be construed in a limiting sense. In the following examples, the molecular weight information was obtained by Gel Permeation Chromatography (GPC) using a polystyrene standard.

EXAMPLES

Example 1

111.0 g of hexane, 100.0 g of 22.0 wt % 1,3-butadiene in hexane, 0.07 ml of bis-oxalanyl propane (1.6 M), and 0.23 ml of n-BuLi (1.6 M) in hexane were added to a dried 28 ounce glass bottle that had been sealed with extracted septum liners and perforated crown caps under a positive nitrogen purge. The bottle was agitated and heated at 50° C. for 1 hour to form a living polymer cement. 0.35 ml of piperidine solution (1.0 M in toluene) was then added to terminate the living polymer cement, resulting in a piperidine lithium and a liquid polymer having a number average molecular weight ($M_n$) of 54,747 (g/mole), as determined by Gel Permeation Chromatography (GPC) using a polystyrene standard. 200.0 g of 22.0 wt % 1,3-butadiene in hexane was then added to the bottle. The bottle was agitated and heated at 50° C. for 1 hour. The polymerization was then terminated by adding 1.5 ml of isopropanol to result in a functionalized polymer having a $M_n$ of 120,407 (g/mole), as determined by GPC using a polystyrene standard. The polymer cement was then treated with 3 ml of 2 wt % di-t-butyl-p-cresol in hexane (an antioxidant), coagulated in isopropanol, and drum dried. The product consisted of 67 wt % of a functionalized polymer and 33 wt % of a liquid polymer dispersed therein. The reaction mechanism for Example 1 is as follows:

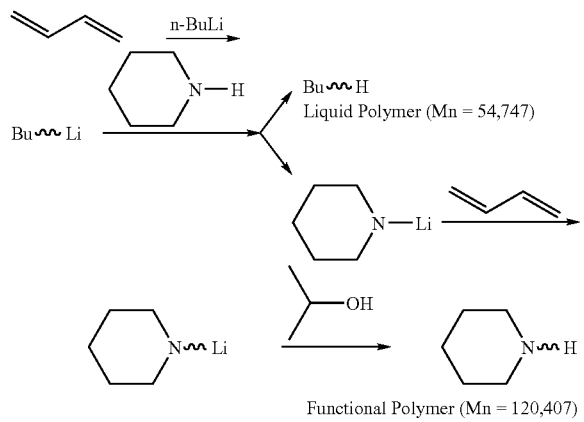

Example 2

111.0 g of hexane, 100.0 g of 22.0 wt % 1,3-butadiene in hexane, 0.07 ml of bis-oxalanyl propane (1.6 M), and 0.23 ml of n-BuLi (1.6 M) in hexane were added to a dried 28 ounce glass bottle that had been sealed with extracted septum liners and perforated crown caps under a positive nitrogen purge. The bottle was agitated and heated at 50° C. for 1 hour to form a living polymer cement. 0.12 ml of hexamethyleneimine solution (3.0 M in hexane) was then added to terminate the living polymer cement, resulting in a liquid polymer having a $M_n$ of 51,026 (g/mole), as determined by Gel Permeation Chromatography (GPC) using a polystyrene standard. 200.0 g of 22.0 wt % 1,3-butadiene in hexane was then added to the bottle. The bottle was agitated and heated at 50° C. for 1 hour. The polymerization was then terminated by adding 1.5 ml of isopropanol to result in a functionalized polymer having a $M_n$ of 112,152 (g/mole), as determined by GPC using a polystyrene standard. The polymer cement was then treated with 3 ml of 2 wt % di-t-butyl-p-cresol in hexane (an antioxidant), coagulated in isopropanol, and drum dried. The product consisted of 67 wt % of a functionalized polymer and 33 wt % of a liquid polymer dispersed therein. The reaction mechanism for Example 2 is as follows:

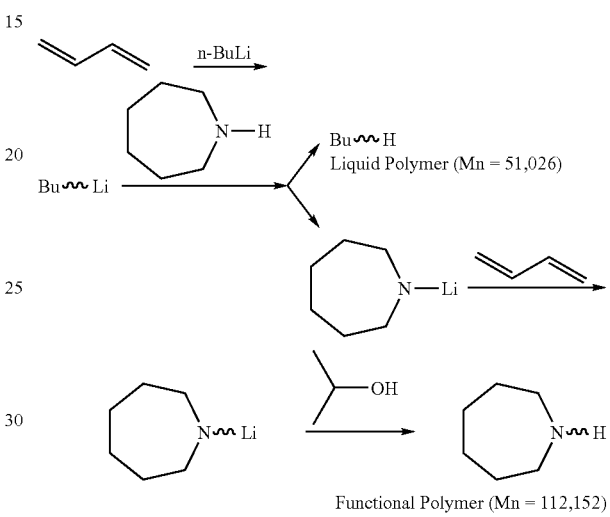

Example 3

111.0 g of hexane, 100.0 g of 22.0 wt % 1,3-butadiene in hexane, 0.07 ml of bis-oxalanyl propane (1.6 M), and 0.23 ml of n-BuLi (1.6 M) in hexane were added to a dried 28 ounce glass bottle that had been sealed with extracted septum liners and perforated crown caps under a positive nitrogen purge. The bottle was agitated and heated at 50° C. for 1 hour to form a living polymer cement. 0.35 ml of 4-(1-pyrrolidinyl)piperidine solution (1.0 M in toluene) was then added to terminate the living polymer cement, resulting in a liquid polymer having a $M_n$ of 58,767 (g/mole), as determined by Gel Permeation Chromatography (GPC) using a polystyrene standard. 200.0 g of 22.0 wt % 1,3-butadiene in hexane was then added to the bottle. The bottle was agitated and heated at 50° C. for 1 hour. 0.37 ml of butyraldehydepiperidinehydrazone solution (1.0 M in hexane) was then added, and the bottle was agitated and heated at 50° C. for 0.5 hour. 1.5 ml of isopropanol was then added to result in a functionalized polymer having a $M_n$ of 133,631 (g/mole), as determined by GPC using a polystyrene standard. The polymer cement was then treated with 3 ml of 2 wt % di-t-butyl-p-cresol in hexane (an antioxidant), coagulated in isopropanol, and drum dried. The product consisted of 67 wt % of a functionalized polymer and 33 wt % of a liquid polymer dispersed therein. The reaction mechanism for Example 3 is as follows:

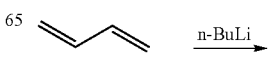

-continued

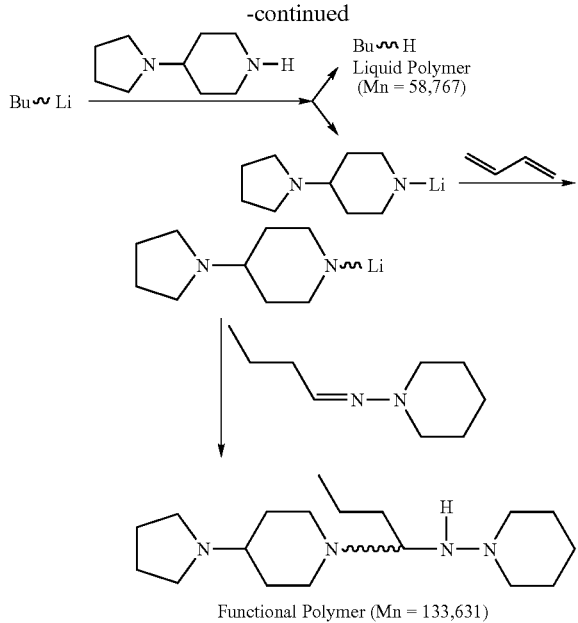

Functional Polymer (Mn = 133,631)

Example 4

111.0 g of hexane, 100.0 g of 22.0 wt % 1,3-butadiene in hexane, 0.07 ml of bis-oxalanyl propane (1.6 M), and 0.23 ml of n-BuLi (1.6 M) in hexane were added to a dried 28 ounce glass bottle that had been sealed with extracted septum liners and perforated crown caps under a positive nitrogen purge. The bottle was agitated and heated at 50° C. for 1 hour to form a living polymer cement. 0.35 ml of 2-[4-(dimethylamino)]phenyl-1,3-dithiane solution (1.0 M in THF)—synthesized by reacting 1,3-propanedithiol with the corresponding aldehyde in THF and purifying the reaction product through column chromatography on silica gel—was then added to terminate the living polymer cement, resulting in a liquid polymer having a $M_n$ of 54,294 (g/mole), as determined by Gel Permeation Chromatography (GPC) using a polystyrene standard. 200.0 g of 22.0 wt % 1,3-butadiene in hexane was then added to the bottle. The bottle was agitated and heated at 50° C. for 1 hour. The polymerization was then terminated by adding 1.5 ml of isopropanol to result in a functionalized polymer having a $M_n$ of 129,153 (g/mole), as determined by GPC using a polystyrene standard. The polymer cement was then treated with 3 ml of 2 wt % di-t-butyl-p-cresol in hexane (an antioxidant), coagulated in isopropanol, and drum dried. The product consisted of 67 wt % of a functionalized polymer and 33 wt % of a liquid polymer dispersed therein. The reaction mechanism for Example 4 is as follows:

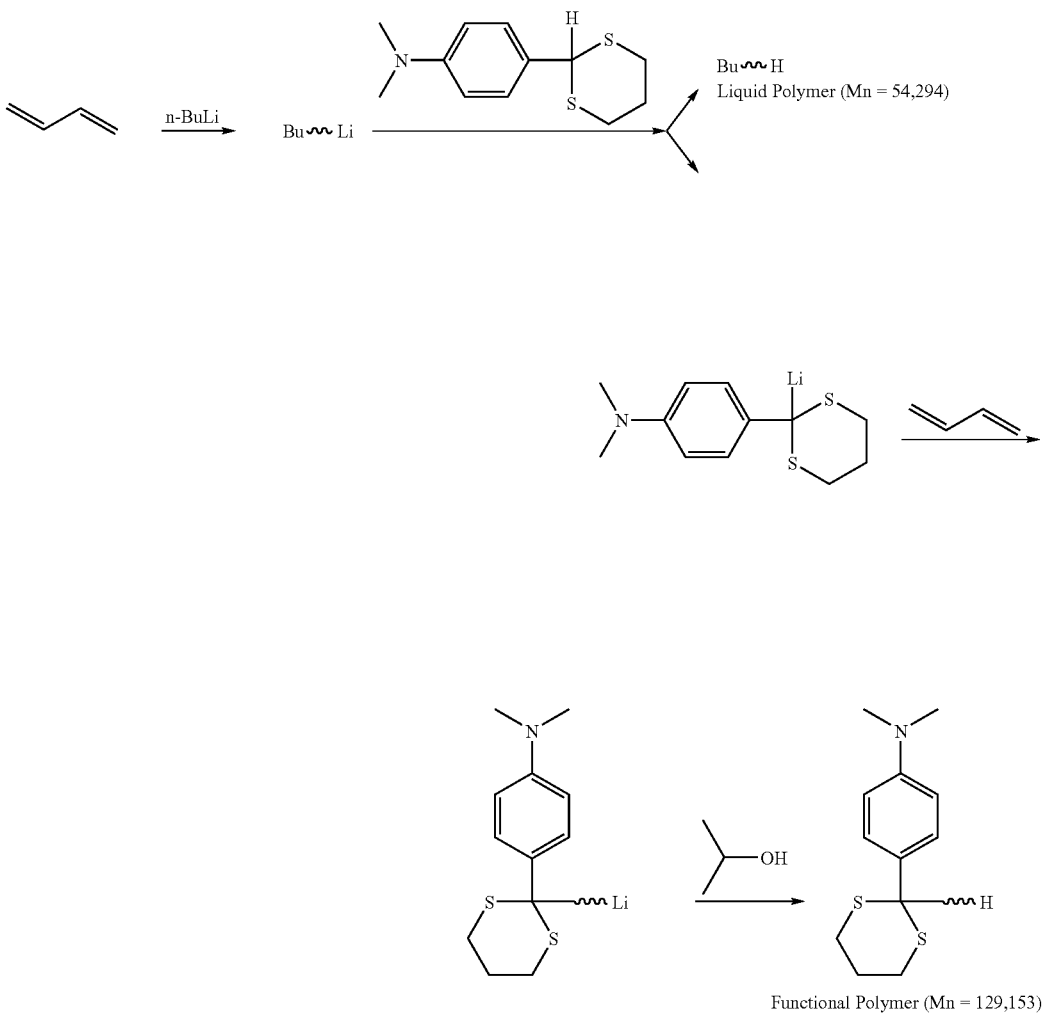

Functional Polymer (Mn = 129,153)

Example 5

111.0 g of hexane, 50.0 g of 22.0 wt % 1,3-butadiene in hexane, 0.08 ml of bis-oxalanyl propane (1.6 M), and 0.24 ml of n-BuLi (1.6 M) in hexane were added to a dried 28 ounce glass bottle that had been sealed with extracted septum liners and perforated crown caps under a positive nitrogen purge. The bottle was agitated and heated at 50° C. for 1 hour to form living polymer cement. 0.13 ml of hexamethyleneimine solution (3.0 M in hexane) was then added to terminate the living polymer cement, resulting in a hexamethyleneimine lithium and a liquid polymer having a Mn of 28,665 (g/mole), as determined by Gel Permeation Chromatography (GPC) using a polystyrene standard. 250.0 g of 22.0 wt % 1,3-butadiene in hexane was then added to the bottle. The bottle was agitated and heated at 50° C. for 1 hour. The polymerization was then terminated by adding 0.4 ml of 1-methyl-2-pyrrolidone (1.0 M in toluene) to result in a functionalized polymer having a Mn of 141,336 (g/mole), as determined by GPC using a polystyrene standard. The polymer cement was then treated with 3 ml of 2 wt % di-t-butyl-p-cresol in hexane (an antioxidant), coagulated in isopropanol, and drum dried. The product consisted of 83 wt % of a functionalized polymer and 17 wt % of a liquid polymer dispersed therein. The reaction mechanism for Example 5 is as follows:

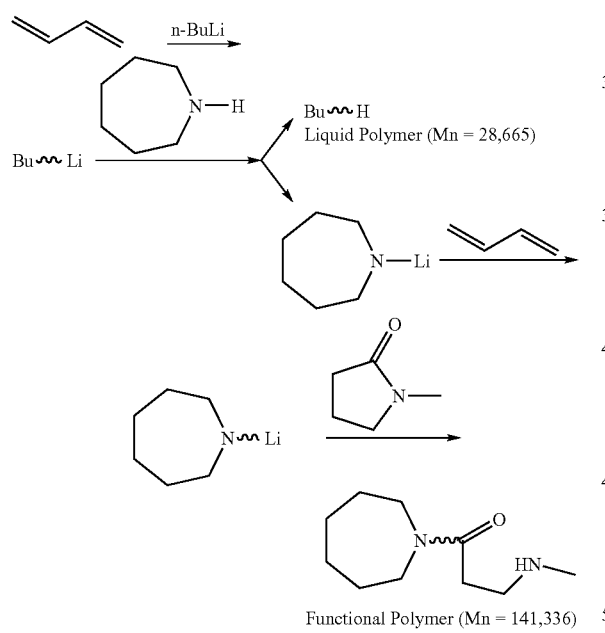

Example 6

111.0 g of hexane, 50.0 g of 22.0 wt % 1,3-butadiene in hexane, 0.08 ml of bis-oxalanyl propane (1.6 M), and 0.24 ml of n-BuLi (1.6 M) in hexane were added to a dried 28 ounce glass bottle that had been sealed with extracted septum liners and perforated crown caps under a positive nitrogen purge. The bottle was agitated and heated at 50° C. for 1 hour to form living polymer cement. 0.38 ml of 4-(1-pyrrolidinyl)piperidine solution (1.0 M in toluene) was then added to terminate the living polymer cement, resulting in a 4-(1-pyrrolidinyl) piperidine lithium and a liquid polymer having a Mn of 29,297 (g/mole), as determined by Gel Permeation Chromatography (GPC) using a polystyrene standard. 250.0 g of 22.0 wt % 1,3-butadiene in hexane was then added to the bottle. The bottle was agitated and heated at 50° C. for 1 hour. The polymerization was then terminated by adding 0.4 ml of 1-methyl-2-pyrrolidone (1.0 M in toluene) to result in a functionalized polymer having a Mn of 140,052 (g/mole), as determined by GPC using a polystyrene standard. The polymer cement was then treated with 3 ml of 2 wt % di-t-butyl-p-cresol in hexane (an antioxidant), coagulated in isopropanol, and drum dried. The product consisted of 83 wt % of a functionalized polymer and 17 wt % of a liquid polymer dispersed therein. The reaction mechanism for Example 6 is as follows:

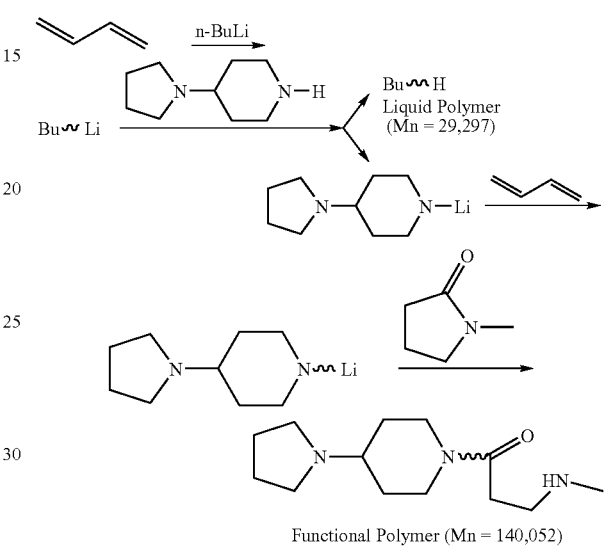

Example 7

111.0 g of hexane, 50.0 g of 22.0 wt % 1,3-butadiene in hexane, 0.08 ml of bis-oxalanyl propane (1.6 M), and 0.24 ml of n-BuLi (1.6 M) in hexane were added to a dried 28 ounce glass bottle that had been sealed with extracted septum liners and perforated crown caps under a positive nitrogen purge. The bottle was agitated and heated at 50° C. for 1 hour to form living polymer cement. 0.38 ml of 2-[4-(dimethylamino)] phenyl-1,3-dithiane solution (1.0 M in THF) was then added to terminate the living polymer cement, resulting in a 2-lithium-2-[4-(dimethylamino)]phenyl-1,3-dithiane and a liquid polymer having a Mn of 29,552 (g/mole), as determined by Gel Permeation Chromatography (GPC) using a polystyrene standard. 250.0 g of 22.0 wt % 1,3-butadiene in hexane was then added to the bottle. The bottle was agitated and heated at 50° C. for 1 hour. The polymerization was then terminated by adding 0.4 ml of 1-methyl-2-pyrrolidone (1.0 M in toluene) to result in a functionalized polymer having a Mn of 142,786 (g/mole), as determined by GPC using a polystyrene standard. The polymer cement was then treated with 3 ml of 2 wt % di-t-butyl-p-cresol in hexane (an antioxidant), coagulated in isopropanol, and drum dried. The product consisted of 83 wt % of a functionalized polymer and 17 wt % of a liquid polymer dispersed therein. The reaction mechanism for Example 7 is as follows:

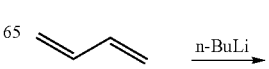

-continued

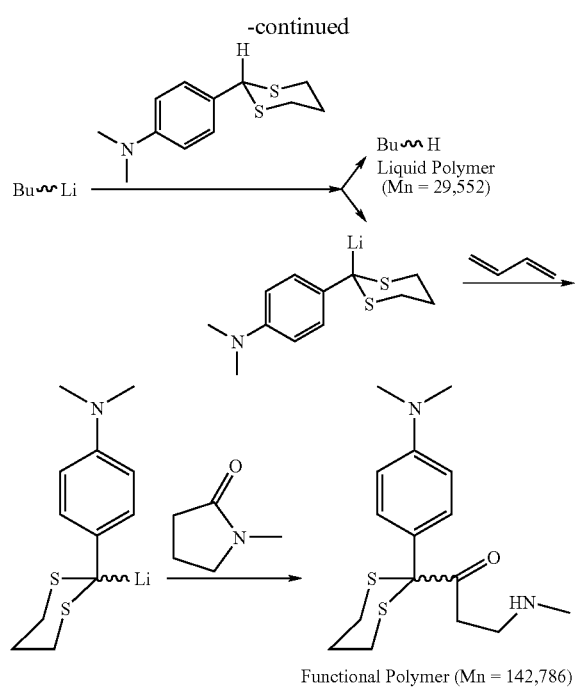

Functional Polymer (Mn = 142,786)

The polymers synthesized in Examples 5-7 were compounded according to the formulation shown in Table 1. In the formulation shown in Table 1, N-phenyl-N'-(1,3-dimethylbutyl)-p-phenyldiamine acts as an antioxidant while benzothiazyl-2-cyclohexylsulfenamide and N,N'-diphenyl guanidine act as accelerators.

TABLE 1

Compound formulation

| | Amount (phr) |
|---|---|
| Masterbatch | |
| Polymer | 100 |
| carbon black (N343 type) | 55 |
| Wax | 1 |
| N-phenyl-N'-(1,3-dimethylbutyl)-p-phenyldiamine | 0.95 |
| ZnO | 2.5 |
| stearic acid | 2 |
| aromatic processing oil | 10 |
| Final | |
| Sulfur | 1.3 |
| benzothiazyl-2-cyclohexylsulfenamide | 1.7 |
| N,N'-diphenyl guanidine | 0.2 |
| TOTAL | 174.65 |

Dispersion Index

Data corresponding to "Dispersion index" were calculated using the equation $$DI = 100 - \exp[A \times \log_{10}(F^2 H) + B]$$

where F is the number of roughness peaks/cm, H is the average roughness peak height, and A and B are constants from Method B in ASTM-D 2663-89. The F and H contour data were acquired by analyzing cut samples (~3.5×2×0.2 cm) with a Surfanalyzer™ profilometer (Mahr Federal Inc.; Providence, R.I.), using the procedure described in Method C (from ASTM-D 2663-89).

Dynamic Mechanical Properties
Bound Rubber

Data corresponding to "Bound rubber" were determined using the procedure described by J. J. Brennan et al., Rubber Chem. and Tech., 40, 817 (1967).

Cure Data $T_{50}$ and MH-ML was measured utilizing the moving die rheometer (MDR) according to ASTM D2084 (1995).

Tensile

The tensile mechanical properties were measured according to ASTM-D 412 (1998) Method B at 25° C. The specimens were rings with a dimension of 1.27 mm width and 1.90 mm thick. A gauge length of 25.4 mm was used for the tensile test.

Dynamic Mechanical Properties

The dynamic mechanical properties were measured using two techniques. For strain sweep testing, a Rheometrics Dynamic Analyzer RDAII (Rheometric Scientific) in the parallel plate mode was used with 15 mm thick, 9.27 mm diameter buttons. The loss modulus (G"), storage modulus (G'), and tan δ were measured over deformation of 0.25-14.5% at 10 Hz and 60° C. The Payne Effect was estimated by calculating the difference of G' (0.25% strain)-G' (14.0% strain).

For temperature sweep testing, a RDA700 (Rheometric Scientific) in the torsion rectangular mode was used with samples having the dimensions 31.7 mm×12.7 mm×2.0 mm. The temperature was increased at a rate of 5° C. min$^{-1}$ from −80° C. to 100° C. The moduli (G' and G") were obtained using a frequency of 5 Hz and a deformation of 0.5% from −80° C. to −10° C. and 2% from −10° C. to 100° C.

Dynastat

Data corresponding to "60° C. Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and 60° C.

Using the formulation from Table 1 above, vulcanizable elastomeric compounds containing reinforcing fillers were prepared from Examples 5-7. Results of physical testing on these compounds are shown below in Table 2.

TABLE 2

Results of Physical Testing

| | Compound Containing Example 5 | Compound Containing Example 6 | Compound Containing Example 7 |
|---|---|---|---|
| $T_g$ (° C.) | −62.7 | −62.6 | −57.8 |
| Dispersion index | 91.5 | 97.8 | 93.3 |
| Bound rubber (%) | 56.3 | 56.7 | 52.9 |
| 171° C. MDR $t_{50}$ (min) | 1.37 | 1.57 | 1.69 |
| 171° C. MH-ML (kg-cm) | 13.72 | 13.77 | 15.53 |
| 300% modulus @ 23° C. (MPa) | 10.36 | 9.97 | 11.30 |
| Tensile strength @ 23° C. (MPa) | 13.4 | 14.9 | 16.1 |
| Temp. sweep 0° C. tan δ (2% strain) | 0.1538 | 0.1438 | 0.1616 |
| Temp. sweep 60° C. tan δ (2% strain) | 0.1060 | 0.0987 | 0.0965 |
| Strain Sweep G' (MPa) @ 60° C., 2% strain, 10 Hz | 3.1524 | 3.4591 | 3.6330 |
| RDA 0.25-14% ΔG' (MPa) | 0.5162 | 0.5178 | 0.7003 |
| 60° C. RDA strain sweep (5% strain) tan δ | 0.1105 | 0.1061 | 0.0973 |
| Strain Sweep G' (MPa) @ 60° C., 5% strain, 10 Hz | 2.2354 | 2.4229 | 2.5267 |
| 60° C. Dynastat tan δ | 0.1061 | 0.1009 | 0.0945 |

The invention claimed is:
1. A method comprising:
   a. forming a living liquid polymer, wherein said living liquid polymer is anionically initiated and comprises a cation;
   b. adding a functional initiator precursor of the formula FI-H, wherein H is hydrogen and FI is a functional group, said H terminates said living liquid polymer resulting in a liquid polymer having a number average molecular weight of about 20,000 (g/mole) to about 100,000 (g/mole), and said FI and said cation form a functional initiator;
   c. adding monomer, wherein said functional initiator initiates anionic polymerization of said monomer; and
   d. terminating the polymerization reaction initiated in step (c).

2. The method of claim 1, wherein steps (a)-(d) are carried out in a single reactor.

3. The method of claim 1, wherein said functional initiator precursor is selected from the group consisting of a secondary amine, a functional dithiane, a trialkyltin hydride, and mixtures thereof.

4. The method of claim 3, wherein said secondary amine is selected from the group consisting of pyrrolidine, piperidine, hexamethyleneimine, 4-(1-pyrrolidinyl) piperidine, 4-piperidinopiperidine, 4,4'-trimethylenedipiperidine, 1-isopropylpiperazine, 1-(3-methoxyphenyl)piperazine, 1-[2-(dimethylamino) ethyl]piperazine, 1- [3 -(dimethylamino)propyl]piperazine, thiomorpholine, and mixtures thereof.

5. The method of claim 3, wherein said functional dithiane is selected from the group consisting of 2-phenyl-1,3-dithiane, 2-[4-(dimethylamino)]phenyl-1,3 -dithiane, 2- [4-(diethylamino)]phenyl-1,3 -dithiane, 2-[4-(4-methylpiperazine)phenyl]-1,3-dithiane, and mixtures thereof.

6. The method of claim 3, wherein said trialkyltin hydride is selected from the group consisting of tributyltin hydride, trioctyltin hydride, and mixtures thereof.

7. The method of claim 1, wherein said living liquid polymer is formed by reacting monomers with an anionic initiator selected from the group consisting of n-butyl lithium, p-tolyllithium, 4-phenylbutyl lithium, 4-butylcyclohexyl lithium, lithium dialkyl amines, lithium dialkyl phosphines, lithiumalkyl aryl phosphine, lithium diaryl phosphines, and mixtures thereof.

8. The method of claim 7, wherein said monomers are selected from the group consisting of 1,3-butadiene, isoprene, 2-ethyl-1,3-butadiene, 2,3-dimethyl-1,3 -butadiene, piperylene (1,3 -pentadiene), 2-methyl-1,3-pentadiene, 3 -methyl-1,3 -pentadiene, 4-methyl-1,3-pentadiene, 2,4-dimethyl-1,3-pentadiene, 1,3 -hexadiene, 1,2-diphenyl-4-methyl-1-hexene, styrene, α-methylstyrene, p-methylstyrene, vinyl toluene, vinyl anthracene, 2-vinylpyridene, 4-vinylpyridine, 1-vinylnaphthalene, 2-vinylnaphthalene, 1-α-methylvinylnaphthalene, 2-α-methylvinylnaphthalene, and mixtures thereof.

9. The method of claim 1, wherein said liquid polymer has a number average molecular weight of about 40,000 (g/mole) to about 70,000 (g/mole).

10. The method of claim 1, wherein step (d) is performed after a number average molecular weight of about 100,000 (g/mole) to about 400,000 (g/mole) is reached.

11. The method of claim 1, wherein said monomer in step (c) is selected from the group consisting of 1,3-butadiene, isoprene, 2-ethyl-1,3-butadiene, 2,3-dimethyl-1,3-butadiene, piperylene (1,3-pentadiene), 2-methyl-1,3-pentadiene, 3 -methyl-1,3 -pentadiene, 4-methyl-1,3-pentadiene, 2,4-dimethyl-1,3-pentadiene, 1,3-hexadiene, 1,2-diphenyl-4-methyl-1-hexene, styrene, α-methylstyrene, p-methylstyrene, vinyl toluene, vinyl anthracene, 2-vinylpyridene, 4-vinylpyridine, 1-vinylnaphthalene, 2-vinylnaphthalene, 1-α-methylvinylnaphthalene, 2-α-methylvinylnaphthalene, and mixtures thereof.

12. The method of claim 1, wherein step (d) comprises the use of at least one functional terminator.

13. The method of claim 12, wherein said functional terminator is selected from the group consisting of $SnCl_4$, $R_3SnCl$, $R_2SnCl_2$, $RSnCl_3$, carbodiimides, N-methylpyrrolidine, cyclic amides, cyclic ureas, isocyanates, Schiff bases, 4,4'-bis(diethylamino) benzophenone, N,N'-dimethylethyleneurea, and mixtures thereof, wherein R is selected from the group consisting of alkyls having from about 1 to about 20 carbon atoms, cycloalkyls having from about 3 to about 20 carbon atoms, aryls having from about 6 to about 20 carbon atoms, aralkyls having from about 7 to about 20 carbon atoms, and mixtures thereof.

14. The method of claim 2, wherein said living liquid polymer is formed from monomers selected from the group consisting of 1,3-butadiene, styrene, isoprene, and mixtures thereof, and said monomer in step (c) is selected from the group consisting of 1,3-butadiene, styrene, isoprene, and mixtures thereof.

15. A composition comprising
   e. a polymer comprising a FI functional group on at least one polymer chain end, and
   f. a liquid polymer having a number average molecular weight of about 20,000 (g/mole) to about 100,000 (g/mole) dispersed in said polymer,
   wherein said polymer is prepared by:
      i. forming a living liquid polymer, wherein said living liquid polymer is anionically initiated and comprises a cation;
      ii. adding a functional initiator precursor of the formula FI-H, wherein H is hydrogen and FI is a functional group, said H terminates said living liquid polymer resulting in a liquid polymer having a number average molecular weight of about 20,000 (g/mole) to about 100,000 (g/mole), and said FI and said cation form a functional initiator;
      iii. adding monomer, wherein said functional initiator initiates anionic polymerization of said monomer; and
      iv. terminating the polymerization reaction initiated in step (iii).

16. The composition of claim 15, wherein steps (i)-(iv) are carried out in a single reactor.

17. The composition of claim 15, wherein said functional initiator precursor is selected from the group consisting of a secondary amine, a functional dithiane, a trialkyltin hydride, and mixtures thereof.

18. The composition of claim 17, wherein said secondary amine is selected from the group consisting of pyrrolidine, piperidine, hexamethyleneimine, 4-(1-pyrrolidinyl) piperidine, 4-piperidinopiperidine, 4,4'-trimethylenedipiperidine, 1-isopropylpiperazine, 1-(3-methoxyphenyl)piperazine, 1-[(dimethylamino)ethyl]piperazine, 1-[3-(dimethylamino)propyl]piperazine, thiomorpholine, and mixtures thereof.

19. The composition of claim 17, wherein said functional dithiane is selected from the group consisting of 2-phenyl-1,3-dithiane, 2-[4-dimethylamino)]phenyl-1,3-dithiane, 2-[4-(diethylamino)]phenyl-1,3-dithiane, 2-[4-(4-methylpiperazine)phenyl]-1,3-dithiane, and mixtures thereof.

20. The composition of claim 17, wherein said trialkyltin hydride is selected from the group consisting of tributyltin hydride, trioctyltin hydride, and mixtures thereof.

21. The composition of claim 15, wherein said living liquid polymer is formed by reacting monomers with an anionic initiator selected from the group consisting of n-butyl lithium, p-tolyllithium, 4-phenylbutyl lithium, 4-butylcyclohexyl lithium, lithium dialkyl amines, lithium dialkyl phosphines, lithiumalkyl aryl phosphine, lithium diaryl phosphines, and mixtures thereof.

22. The composition of claim 21, wherein said monomers are selected from the group consisting of 1,3-butadiene, isoprene, 2-ethyl-1,3-butadiene, 2,3-dimethyl-1,3-butadiene, piperylene (1,3-pentadiene), 2-methyl-1,3-pentadiene, 3-methyl-1,3-pentadiene, 4-methyl-1,3-pentadiene, 2,4-dimethyl-1,3-pentadiene, 1,3-hexadiene, 1,2-diphenyl-4-methyl-1-hexene, styrene, α-methylstyrene, p-methylstyrene, vinyl toluene, vinyl anthracene, 2-vinylpyridene, 4-vinylpyridine, 1-vinylnaphthalene, 2-vinylnaphthalene, 1-α-methylvinylnaphthalene, 2-α-methylvinylnaphthalene, and mixtures thereof.

23. The composition of claim 15, wherein said liquid polymer has a number average molecular weight of about 40,000 (g/mole) to about 70,000 (g/mole).

24. The composition of claim 15, wherein step (iv) is performed after a number average molecular weight of about 100,000 (g/mole) to about 400,000 (g/mole) is reached.

25. The composition of claim 15, wherein said monomer in step (iii) is selected from the group consisting of 1,3-butadiene, isoprene, 2-ethyl-1,3-butadiene, 2,3-dimethyl-1,3-butadiene, piperylene (1,3-pentadiene), 2-methyl-1,3-pentadiene, 3-methyl-1,3-pentadiene, 4-methyl-1,3-pentadiene, 2,4-dimethyl-1,3-pentadiene, 1,3-hexadiene, 1,2-diphenyl-4-methyl-1-hexene, tyrene, α-methylstyrene, p-methylstyrene, vinyl toluene, vinyl anthracene, 2-vinylpyridene, 4-vinylpyridine, 1-vinylnaphthalene, 2-vinylnaphthalene, 1-α-methylvinylnaphthalene, 2-α-methylvinylnaphthalene, and mixtures thereof.

26. The composition of claim 15, wherein step (iv) comprises the use of at least one functional terminator.

27. The composition of claim 26, wherein said functional terminator is selected from the group consisting of SnCl$_4$, R$_3$SnCl, R$_2$SnCl$_2$, RSnCl$_3$, carbodiimides, N-methylpyrrolidine, cyclic amides, cyclic ureas, isocyanates, Schiff bases, 4,4'-bis(diethylamino) benzophenone, N,N'-dimethylethyleneurea, and mixtures thereof, wherein R is selected from the group consisting of alkyls having from about 1 to about 20 carbon atoms, cycloalkyls having from about 3 to about 20 carbon atoms, aryls having from about 6 to about 20 carbon atoms, aralkyls having from about 7 to about 20 carbon atoms, and mixtures thereof.

28. The composition of claim 16, wherein said living liquid polymer is formed from monomers selected from the group consisting of 1,3-butadiene, styrene, isoprene, and mixtures thereof, and said monomer in step (iii) is selected from the group consisting of 1,3-butadiene, styrene, isoprene, and mixtures thereof.

29. The composition of claim 15, wherein the weight ratio of said liquid polymer to said polymer comprising a FI functional group on at least one polymer chain end is from about 5:95 to about 20:80.

30. A tire comprising the composition of claim 15.

31. A method comprising:
  a. forming a living liquid polymer wherein said living liquid polymer is anionically initiated and comprises a cation;
  b. adding a functional initiator precursor of the formula FI-H, wherein H is hydrogen and FI is a functional group, said H terminates said living polymer and said FI and said cation form a functional initiator;
  c. adding monomer, wherein said functional initiator initiates anionic polymerization of said monomer; and
  d. terminating the polymerization reaction initiated in step (c).

32. The method of claim 31, wherein said functional initiator precursor is selected from the group consisting of a secondary amine, a functional dithiane, a trialkyltin hydride, and mixtures thereof.

33. The method of claim 31, wherein step (d) comprises the use of at least one functional terminator.

34. The method of claim 33, wherein said functional terminator is selected from the group consisting of SnCl$_4$, R$_3$SnCl, R$_2$SnCl$_2$, RSnCl$_3$, carbodiimides, N-methylpyrrolidine, cyclic amides, cyclic ureas, isocyanates, Schiff bases, 4,4'-bis(diethylamino) benzophenone, N,N'-dimethylethyleneurea, and mixtures thereof, wherein R is selected from the group consisting of alkyls having from about 1 to about 20 carbon atoms, cycloalkyls having from about 3 to about 20 carbon atoms, aryls having from about 6 to about 20 carbon atoms, aralkyls having from about 7 to about 20 carbon atoms, and mixtures thereof.

* * * * *